United States Patent
Liu et al.

(10) Patent No.: US 9,348,094 B1
(45) Date of Patent: May 24, 2016

(54) AXIAL ALIGNMENT OF A LENSED FIBER IN A SILICA V-GROOVE

(71) Applicant: Skorpios Technologies, Inc., Albuquerque, NM (US)

(72) Inventors: Daming Liu, Albuquerque, NM (US); John Zyskind, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 14/857,580

(22) Filed: Sep. 17, 2015

Related U.S. Application Data

(60) Provisional application No. 62/136,504, filed on Mar. 21, 2015, provisional application No. 62/136,503, filed on Mar. 21, 2015.

(51) Int. Cl.
  *G02B 6/14* (2006.01)
  *G02B 6/36* (2006.01)
  *G02B 6/12* (2006.01)
  *G02B 6/30* (2006.01)
  *G02B 6/42* (2006.01)

(52) U.S. Cl.
  CPC .............. *G02B 6/3636* (2013.01); *G02B 6/30* (2013.01); *G02B 6/3652* (2013.01); *G02B 6/4225* (2013.01); *G02B 6/4239* (2013.01)

(58) Field of Classification Search
  CPC ...... G02B 6/30; G02B 6/3636; G02B 6/3652; G02B 6/4225; G02B 6/4239
  USPC .......................... 385/41–49, 88, 147
  See application file for complete search history.

(56) References Cited

U.S. PATENT DOCUMENTS

| | | | |
|---|---|---|---|
| 4,717,229 A | | 1/1988 | Cutler |
| 5,351,328 A | | 9/1994 | Kakii et al. |
| 5,359,687 A | * | 10/1994 | McFarland ............. G02B 6/138 385/49 |
| 5,370,649 A | * | 12/1994 | Gardetto ................ A61B 18/24 606/15 |
| 5,479,024 A | * | 12/1995 | Hillner ................... B82Y 20/00 250/458.1 |
| 6,594,419 B2 | | 7/2003 | Ukrainczyk et al. |
| 6,856,749 B2 | | 2/2005 | Kosuge et al. |
| 6,873,768 B2 | | 3/2005 | Duelli et al. |
| 7,177,550 B1 | * | 2/2007 | Smith ................ H04B 10/1121 398/118 |
| 7,649,189 B2 | | 1/2010 | Cole |

(Continued)

FOREIGN PATENT DOCUMENTS

CN 202649532 1/2013

OTHER PUBLICATIONS

Porte et al (2011). Epoxy free butt coupling between a lensed fiber and a silicon nanowire waveguide with an inverted taper configuration. 8th *IEEE International Conference on Group IV Photonics*, 978-1-4244-8340-2/11/, 386-388. Retrieved from http://ieeexplore.ieee.org/.

*Primary Examiner* — Akm Enayet Ullah

(74) *Attorney, Agent, or Firm* — Kilpatrick Townsend & Stockton LLP

(57) ABSTRACT

A v-groove assembly is used to edge couple a lensed fiber (e.g., an optical fiber made of silica) with a waveguide in a photonic chip. The v-groove assembly is made from fused silica. Fused silica is used to so that an adhesive (e.g., epoxy resin) used in bonding the lensed fiber to the v-groove assembly and/or bonding the v-groove assembly to the photonic chip can be cured, at least partially, by light.

10 Claims, 8 Drawing Sheets

(56) References Cited

U.S. PATENT DOCUMENTS

| | | | |
|---|---|---|---|
| 8,201,268 B1* | 6/2012 | Ho | B82Y 20/00 850/52 |
| 2003/0053758 A1 | 3/2003 | Monte | |
| 2004/0165829 A1* | 8/2004 | Botet | G02B 6/138 385/49 |
| 2010/0301352 A1* | 12/2010 | Strandjord | G01C 19/722 257/84 |
| 2011/0261580 A1 | 10/2011 | Seo et al. | |
| 2015/0098676 A1 | 4/2015 | Krasulick et al. | |

* cited by examiner

AXIAL ALIGNMENT OF A LENSED FIBER IN A SILICA V-GROOVE

CROSS-REFERENCES TO RELATED APPLICATIONS

This application claims priority to U.S. Provisional Application No. 62/136,504, filed on Mar. 21, 2015, and U.S. Provisional Application No. 62/136,503, filed on Mar. 21, 2015, the disclosures of which are incorporated by reference for all purposes.

BACKGROUND

Silicon integrated circuits have dominated the development of electronics, and many technologies based upon silicon processing have been developed over the years. Their continued refinement led to nano-scale feature sizes that can be important for making metal oxide semiconductor CMOS (complementary metal-oxide semiconductor) circuits. Silicon can be used as an optical medium, particularly for light having a wavelength of about 1.55 microns ($\mu$m). Light having a wavelength of 1.55 $\mu$m is often used for fiber-optic telecommunication systems. Some silicon devices have both electronic and optical components.

BRIEF SUMMARY OF THE INVENTION

This application relates to coupling optical waveguides. More specifically, and without limitation, to coupling an optical fiber with a semiconductor waveguide, such as a waveguide made in silicon.

A v-groove assembly is used to edge couple a lensed fiber (e.g., an optical fiber made of silica) with a waveguide in a photonic chip. For example the lensed fiber is butt-coupled to the photonic chip. The v-groove assembly is made from fused silica (e.g., by diamond dicing and/or etching). Fused silica is used so that resin used in bonding the lensed fiber to the v-groove assembly, and/or bonding the v-groove assembly to the photonic chip, can be cured, at least partially, by light (e.g., ultraviolet (UV) light used to cure the resin). In some embodiments, the photonic chip comprises silicon, and the waveguide comprises a crystalline-silicon core (e.g., the crystalline-silicon core being formed from a device layer of a silicon-on-insulator wafer). In some embodiments, photonic chips comprising other materials are used (e.g., II-VI and/or III-V compounds; including GaAs and/or InP and related compounds). In some embodiments, the photonic chip comprises two semiconductor materials. The photonic chip comprises an edge facet where the waveguide terminates and is coupled with the lensed fiber.

In some embodiments, a method for aligning an optical fiber with a v-groove assembly is described. A facet of the v-groove assembly is placed next to a mirror. A first end of the optical fiber is placed in a v-groove of the v-groove assembly, wherein the v-groove assembly comprises a base and a lid. The lid is placed over the optical fiber so that the optical fiber is between the base and the lid. An adhesive is applied to the v-groove assembly and/or the optical fiber for bonding the optical fiber to the v-groove assembly. A second end of the optical fiber is connected to a splitter, wherein the splitter is optically coupled with an optical source and a detector. Light of a first wavelength is transmitted from the optical source, through the splitter, to the optical fiber, and out the optical fiber through a tip of the first end of the optical fiber. With the mirror, light of the first wavelength is reflected back from the tip of the optical fiber back into the optical fiber through the tip. Light of the first wavelength is transmitted from the tip to the detector through the splitter. Feedback is received from the detector. A distance between the tip of the optical fiber and the mirror is adjusted based on feedback from the detector. The adhesive is at least partially cured using light of a second wavelength passing through the lid, after adjusting the distance between the tip of the optical fiber and the mirror.

In some embodiments, the lid is made of fused silica; the base is made of fused silica; light of the first wavelength is infrared light and light of the second wavelength is ultraviolet light; adjusting the distance between the tip of the optical fiber and the mirror includes moving the optical fiber in an axial direction to optimize received power at the detector; the chip comprises crystalline silicon and/or III-V material; and/or the adhesive is an epoxy resin configured to be at least partially cured by ultraviolet light. In some embodiments, the method further comprises bonding the v-groove assembly to a chip, after at least partially curing the adhesive.

A system for aligning an optical fiber with a v-groove assembly is described. The system comprises the optical fiber. The optical fiber has a first end and a second end; and the first end comprises a tip. The system comprises the v-groove assembly. The v-groove assembly comprises a base; a lid, wherein the first end of the optical fiber is between the base and the lid; and a facet for bonding to a chip, wherein the first end of the optical fiber is placed between the base and the lid such that the facet extends beyond the of the optical fiber. The system comprises an optical source, detector, and splitter. The splitter is coupled with the second end of the optical fiber, the optical source, and the detector. The system comprises a mirror for reflecting light from the optical source traveling out of the tip of the optical fiber back into the tip of the optical fiber and to the detector.

In some embodiments, in the system for aligning an optical fiber with a v-groove assembly, the optical source emits infrared light, the system further comprises a lamp, the lamp emits ultraviolet light, and/or the system further comprises an adhesive, at least partially cured by ultraviolet light, used to bond the optical fiber to the base and the lid; the v-groove assembly further comprises a v-groove, the optical fiber is in the v-groove, and the v-groove does not extend to the facet; the system further comprises an optical circulator or an optical isolator between the optical source and the splitter; the detector is a power meter; the lid is made of fused silica; and/or the base is made of fused silica.

An optical assembly for connecting an optical fiber to a semiconductor waveguide is described. The optical assembly comprises a v-groove assembly and adhesive. The v-groove assembly comprises a base; a lid; a v-groove; and a facet, wherein the facet is for bonding the v-groove assembly to a chip. The optical fiber in the v-groove, positioned between the base and the lid. The adhesive bonds the optical fiber to the base and the lid, wherein the adhesive is, at least partially, cured using light. In some embodiments, the base and/or the lid comprise fused silica. In some embodiments, the lid consists of fused silica.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s), and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In some embodiments, an optical fiber is optically coupled to a waveguide in a chip (in some embodiments the chip is also referred to as a photonic chip or optical chip) using a v-groove assembly. For example, the waveguide is crystalline silicon etched in a device layer of a silicon-on-insulator substrate. The v-groove assembly is made of silica. For example, the v-groove assembly is made by dicing, machining, grinding, etching, and/or polishing fused silica. Silica (SiO2) is used because silica is optically transparent to ultraviolet (UV) light in some forms. The optical fiber is bonded to the v-groove assembly using a resin cured by UV light, and/or the v-groove assembly is bonded to the chip using a resin cured by UV light. Forming the v-groove assembly from silica allows UV light to pass through parts of v-groove assembly for curing the resin.

Figure 1:
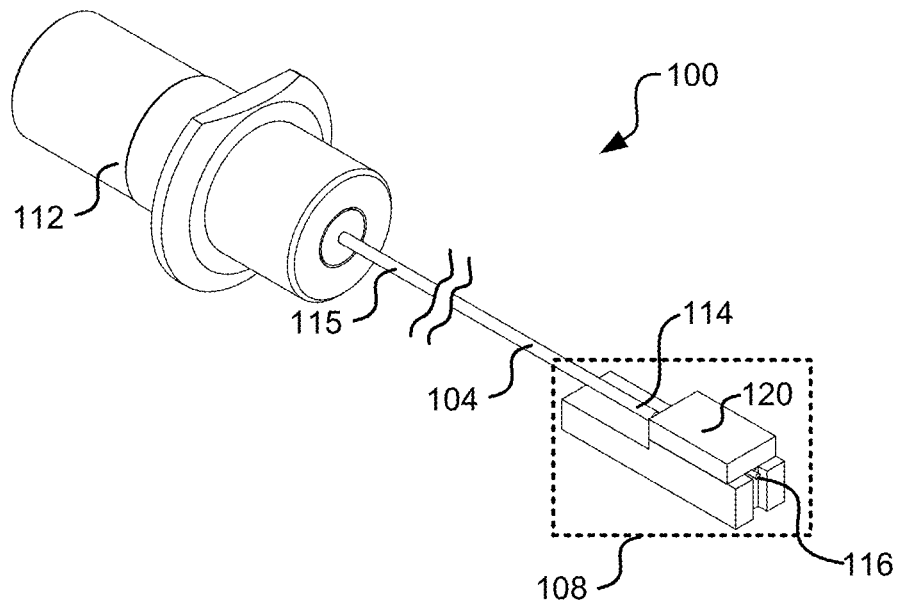
FIG. 1 depicts a perspective view of an embodiment an optical adapter using a v-groove assembly.

Referring to FIG. 1, a perspective view of an embodiment an optical adapter 100 is shown. The optical adapter 100 optically couples a waveguide on a chip to a fiber-optics network. The optical adapter 100 comprises an optical fiber 104, a v-groove assembly 108, and a receptacle 112. A first end 114 of the optical fiber 104 is attached to the v-groove assembly 108, and a second end 115 of the optical fiber 104 is attached to the receptacle 112.

In some embodiments, the optical fiber 104 is made of silica (e.g., Corning SMF-28 Ultra or similar fibers). The optical fiber 104 comprises a tip 116 at the first end 114 of the optical fiber 104. In some embodiments, the tip 116 is lensed (e.g., a tapered tip) for focusing light exiting the tip 116 of the optical fiber 104. In some embodiments, the optical fiber 104 has an ultra-high numerical aperture (NA). For example, ultra-high NA fibers have NA≥0.25. In some embodiments, 0.5≥NA≥0.25.

The first end 114 of the optical fiber 104 is secured to the v-groove assembly 108. A lid 120 of the v-groove assembly 108 covers the optical fiber 104 to secure the optical fiber 104 in the v-groove assembly 108. An adhesive that is cured by UV light (e.g., an epoxy resin, and/or UV/thermal curable, low-shrinkage epoxy resin) is used to secure the optical fiber 104 to the v-groove assembly 108.

In some embodiments, the second end 115 of the optical fiber 104 is connected to the receptacle 112. In some embodiments, the second end 115 of the optical fiber is fusion spliced to a fiber network. In some embodiments, the receptacle 112 is shaped as an LC connector (e.g., complying with IEC (International Electrotechnical Commission) standard 61754-20). The receptacle 112 allows for more simple and/or convenient optical connection to an optical network (e.g., for connecting to an intranet or to the Internet) than splicing optical fibers.

Figure 2:
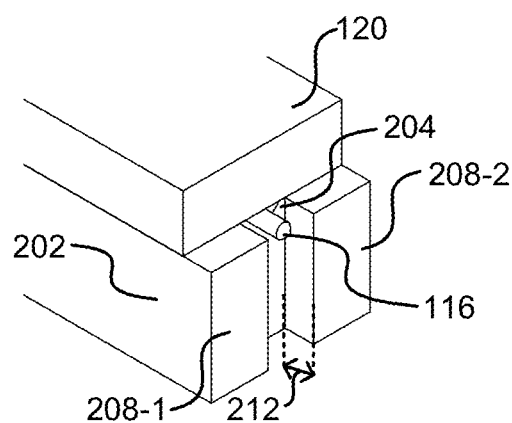
FIG. 2 depicts a perspective view of an embodiment of a portion of the v-groove assembly.

FIG. 2 depicts a perspective view of an embodiment of a portion of the v-groove assembly 108. The v-groove assembly 108 comprises the lid 120, and a base 202. The base 202 comprises a v-groove 204 and one or more facets 208. In FIG. 2, the base 202 comprises a first facet 208-1 and a second facet 208-2. The first facet 208-1 is to one side of the v-groove 204 and the second facet 208-2 is to another side of the v-groove 204. The facets 208 are for bonding the v-groove assembly 108 to a chip.

The first end 114 of the optical fiber 104 is placed in the v-groove 204, and the lid 120 is placed over the optical fiber 104. The facets 208 extend beyond, in an axial direction, the v-groove 204 for bonding to a chip. The axial direction is a direction along an axis of the optical fiber 104 (e.g., direction of beam propagation). A lateral direction is orthogonal to the axial direction; and the lateral direction can be further subdivided into a vertical direction and a horizontal direction. The tip 116 of the optical fiber 104 extends past the v-groove 204, axially. In some embodiments, the facets 208 extend past the v-groove 204 so that an adhesive used to bond the v-groove assembly 108 to the chip is not as likely to cover the tip 116 of the optical fiber 104. In some embodiments, the v-groove 204 comprises two bonding facets 208 to provide structural support when securing the v-groove assembly 108 to the photonic chip. The bonding facets 208 extend past the v-groove 204 a first length 212. In some embodiments, the first length 212 is between 100 and 300 µm and/or 225 and 275 µm (e.g., 150, 200, 250, or 300 µm).

Figure 3:
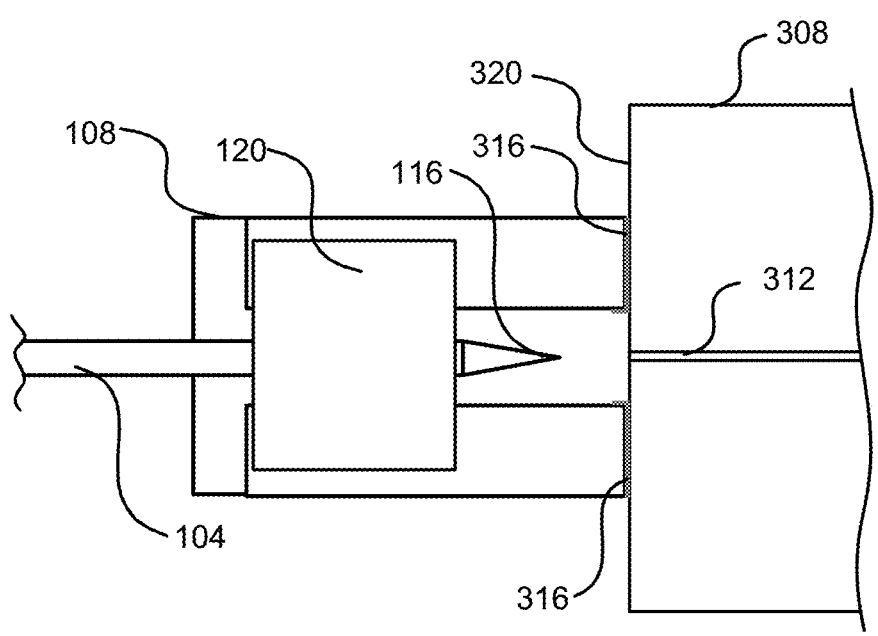
FIG. 3 depicts a top view of an embodiment of the v-groove assembly aligned with a chip.

FIG. 3 depicts a top view of an embodiment of the v-groove assembly 108 aligned with a chip 308. The chip 308 comprises a waveguide 312 (e.g., a semiconductor waveguide made of crystalline silicon). An adhesive 316 is used to bond the v-groove assembly 108 to the chip 308. The adhesive 316 is applied to the bonding facet 208 of the v-groove assembly 108 and to an edge facet 320 of the chip 308.

In some embodiments, the chip 308 comprises and/or is optically coupled with a receiver (e.g., photodiode). In some embodiments, the waveguide 312 is optically coupled with the receiver. In some embodiments, the chip 308 comprises one or more other chips (e.g., III-V chips for a gain medium) as described in U.S. application Ser. No. 14/509,914, filed on Oct. 8, 2014, which is incorporated by reference. The v-groove assembly 108 is aligned by applying adhesive 316 to the bonding facet 208 (or to the edge facet 320 of the chip 308, or both), and the v-groove assembly 108 is roughly aligned with the chip 308 (e.g., bringing the v-groove assembly 108 near the edge facet 320 of the chip 308). Light is transmitted through the optical fiber 104 and into the waveguide 312. A gripper holding the v-groove assembly 108 is adjusted to position the tip 116 of the optical fiber 104 in relation to the waveguide 312 to optimize optical transmission from the optical fiber 104 into the waveguide 312 (e.g., the receiver registers a maximum power; a percentage of maximum power, e.g., >90%, 95%; or a predetermined threshold power). In some embodiments, the v-groove assembly 108 is actively aligned (e.g., using a computerized system). In some embodiments, a thickness of the adhesive 316 before a first cure is equal to or less than 10, 8, or 7 μm. In some embodiments, the bonding facets 208 are polished and the thickness of the epoxy resin before the first cure is equal to or less than 5 μm (e.g., separation of the bonding facet from the edge facet is equal to or less than 5 μm). In some embodiments, the bonding facets 208 are pitted and/or roughened for an adhesive 316 to better adhere to. In some embodiments, a thickness of the adhesive 316 before the first cure is 7-10 μm, because results from bonding show 7-10 μm forms a stable bond, which is sufficient for some applications. In some embodiments, the waveguide 312 has a height (vertical) and/or width (horizontal) equal to or less than 12, 10, 8, 5, 2, 1.7, 1.6, or 1.5 μm. In some embodiments, the waveguide has a height (vertical) and/or width (horizontal) greater than 1.0 or 1.5 μm for improved coupling with the optical fiber 104 (e.g., with a tapering waveguide). In some embodiments, only one dimension (e.g., a lateral dimension) is adjusted by the gripper holding the v-groove assembly 108. For example, a vertical height (i.e., into and out of the page of FIG. 3) is determined by a height of the v-groove 204 of the v-groove assembly 108; an axial distance (along a direction of beam propagation of the optical fiber 104) between the tip 116 of the optical fiber 104 and the edge facet 320 of the chip 308 is determined by a distance between the tip 116 of the optical fiber 104 and the bonding facet 208. In some embodiments, the bonding facet 208 is placed to touch the edge facet 320 of the chip 308, and then the v-groove assembly is moved away from the edge facet 320 of the chip 308 a predetermined distance (e.g., 7-10 μm) before adhesive 316 is applied between the bonding facet 208 and the edge facet 320.

After the tip 116 of the optical fiber 104 is aligned to the waveguide 312 of the chip 308 (e.g., by the gripper holding the v-groove assembly 108), a first cure of the adhesive 316 is performed (e.g., by irradiating the adhesive 316 with light). In some embodiments, the adhesive 316 is an epoxy resin cured with ultraviolet (UV) light (e.g., light having a wavelength between 100 nm and 400 nm, or between 250 and 400 nm). In some embodiments, the v-groove assembly 108 is made of fused silica, which is made transparent to UV light, so that UV light can be shined through the v-groove assembly 108 to cure the adhesive 316 that is between the bonding facet 208 of the v-groove assembly 108 and the edge facet 320 of the chip 308. In some embodiments, the v-groove assembly 108 is made of silica having greater than 60% or 70% transmission for wavelengths from 250 nm to 400 nm, or from 300 nm to 400 nm (e.g., UV-grade silica and/or broadband silica). It is noted that crystalline silicon has low transmission (e.g., <20%) for wavelengths less than 900 nm. In some embodiments, additional epoxy resin is added after the first cure (e.g., to sides and/or other surfaces of the v-groove assembly 108), and a second cure is performed where the additional epoxy resin is cured with UV light. In some embodiments, two steps of curing epoxy resin is used because the first cure is used to set alignment of the v-groove, wherein using less epoxy resin has less shrinkage during UV cure. And the second cure, with the additional epoxy resin, is used to add more epoxy resin to form a more robust bond between the v-groove assembly 108 and the chip 308. After the second cure (or in some embodiments after the first cure if the second cure is not used), a thermal cure is performed. The thermal cure further hardens the epoxy resin.

In some embodiments, coupling arrangement between the optical fiber 104 and the waveguide 312 shown in FIG. 3 is compact, which reduces space on a printed circuit board assembly (PCBA). Further, coupling loss during adhesive 316 cure is reduced and reliability is improved.

Figure 4:
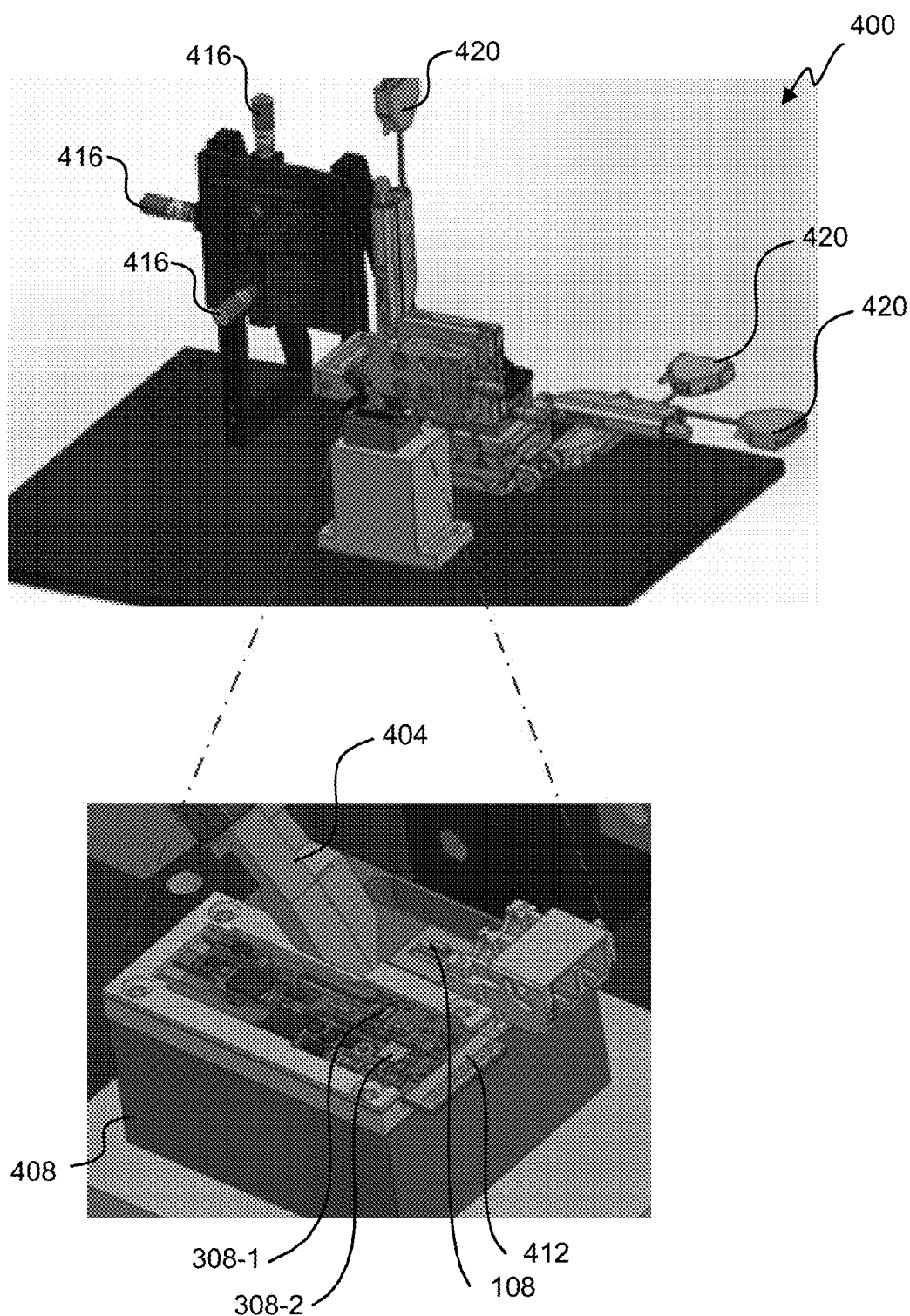
FIG. 4 depicts an embodiment of an alignment station.

FIG. 4 depicts an embodiment of an alignment station 400. The alignment station 400 comprises a gripper 404 and a PCBA mount 408. The PCBA mount 408 secures a PCBA 412. The PCBA 412 comprises a first chip 308-1 and a second chip 308-2. The gripper 404 is used to align the v-groove assembly 108 with the first chip 308-1 or the second chip 308-2. In some embodiments, mechanical controls 416 are used to move the gripper 404. In some embodiments, electrical connections 420 are used to automate alignment of the v-groove assembly 108 with the chip 308. Such a system has demonstrated robust, high coupling efficiency alignment. In some embodiments, a sub mount is used instead of the PCBA 412.

Figure 5:
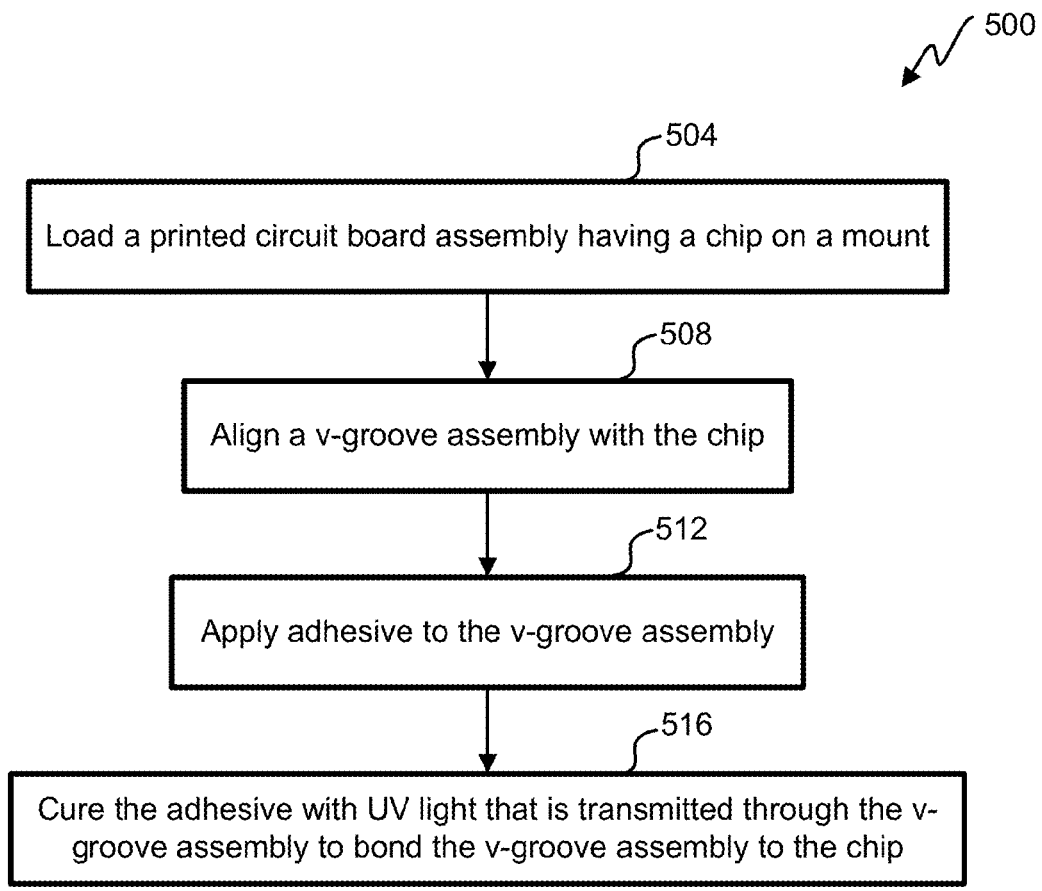
FIG. 5 depicts a flowchart of an embodiment of a process for aligning an optical fiber in the v-groove assembly with a waveguide in a chip.

FIG. 5 depicts a flowchart of an embodiment of a process 500 for aligning the optical fiber 104, which is in the v-groove assembly 108, with the chip 308. The process 500 for aligning the optical fiber 104 with the chip 308 begins in step 504 with loading the PCBA 412 (or a sub mount) on the PCBA mount 408. In some embodiments, the PCBA 412 is loaded on the PCBA mount 408 after chip(s) 308 and/or wire bonding are added to the PCBA 412. The gripper 404 picks up the v-groove assembly 108 (e.g., by the lid 120 of the v-groove assembly 108) and actively aligns the v-groove assembly 108 with the chip 308, step 508. In some embodiments, alignment involves providing active lateral and/or active axial (longitudinal) alignment. For reliability, and/or to minimize movement during adhesive 316 curing, in some embodiments, thickness of the adhesive 316 for butt-bonding between the v-groove assembly 108 and the chip 308 is reduced (e.g., <10 μm). In some embodiments, an initial-alignment position is established. After an initial alignment, the v-groove assembly 108 is moved, using the gripper 404, away from the chip 308. In step 512, adhesive 316 is applied to the v-groove assembly 108 (e.g., bonding facets 208). In some embodiments, a first amount of epoxy resin (e.g., a portion of adhesive 316) is applied to the bonding facet(s) 208 of the v-groove assembly 108. The v-groove assembly 108 is moved back to the initial-alignment position using the gripper 404 (e.g., automatically using the gripper 404 and electrical connections 420 after the first amount of epoxy resin is applied). In some embodiments, a final alignment is performed. In some embodiments, a first cure of the adhesive 316 is performed, wherein the first cure at least partially cures the first amount of epoxy resin between the bonding facet 208 and the edge facet 320 of the chip 308 (e.g., UV curing by shining UV light through the v-groove assembly 108, such as through the bonding facet 208). In some embodiments, a second amount of epoxy resin (e.g., a portion of adhesive 316) is applied to the v-groove assembly 108 and/or the chip 308. In some embodiments, a second cure of the adhesive 316 is performed to further secure the v-groove assembly 108 to the chip 308 and/or the PCBA 412 (e.g., the adhesive is a two-step adhesive, which is thermally cured after UV curing). In some embodiments, the adhesive 316 is thermally cured after UV curing. In some embodiments, additional assembly of the PCBA 412 is performed after a UV curing and/or a thermal curing of the adhesive 316.

In some embodiments, using a v-groove assembly 108 bonded to the chip 308 holds the optical fiber 104 with high stability for optical coupling; the fused silica optical properties enable UV curing of the adhesive 316 (e.g., epoxy resin) between the v-groove assembly 108 and the chip 308. Shifting of the tip 116 of the optical fiber 104 during UV curing and/or thermal curing is small (e.g., is less than 0.5, 0.4, 0.3, 0.2, or 0.1 µm, in each of the three directions); and/or directly bonding the v-groove assembly 108 to the edge facet 320 of the chip 308 makes a stable bond when temperature varies. In some embodiments, a similar design can be applied to discrete optics coupling. For example, an optical assembly is formed that holds a discrete optical element (e.g., a lens). The optical assembly has facets for bonding to a photonic chip similar to the bonding facets 208 of the v-groove assembly 108. The optical assembly is then bonded to the photonic chip (e.g., similarly as the v-groove assembly 108 is bonded to the chip 308). Because of a larger working distance that discrete optical elements normally have, a geometry with discrete optics would not likely be as compact as for a lensed fiber. However, attachment of an optical mount directly to the edge facet 320 of the chip 308 would still provide a more compact geometry and a direct attachment of the discrete optical element to the chip 308, minimizing movement during curing and from thermal effects, and/or improving reliability.

In a previous approach by the applicant (and not admitted by the applicant to be prior art), a discrete lens plus a fiber collimator was used. Fiber output was collimated using a pigtailed collimator. A discrete lens coupled light into a waveguide (e.g., waveguide 312 on the chip 308). Some embodiments of this disclosure differ in that a lensed fiber is directly coupled to the waveguide (e.g., without a collimator and/or discrete lens); a v-groove assembly 108 is used to hold the optical fiber 104; the v-groove assembly 108 is attached directly to the chip 308 (e.g., by epoxy); higher optimal coupling efficiency during alignment is achieved; less movement during epoxy resin curing is achieved; improved final coupling efficiency is achieved; higher reliability is achieved; reduced temperature dependence of coupling efficiency due to thermal expansion due to compact geometry and/or limited epoxy thickness is achieved; and/or reduced board real estate is achieved.

Figure 6:
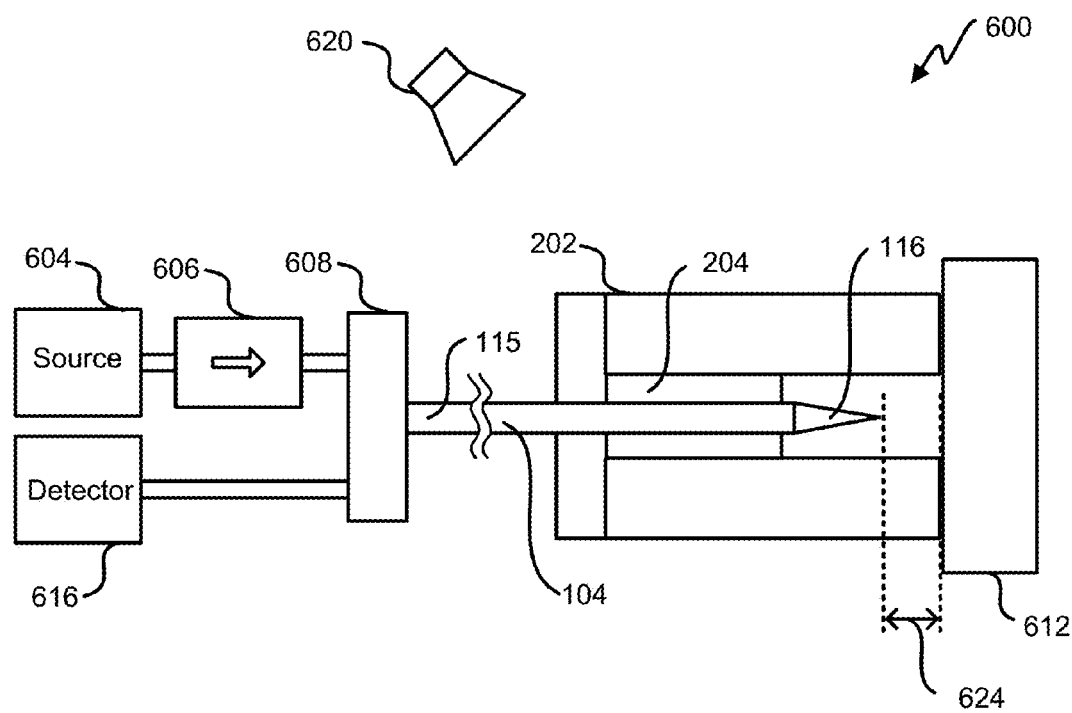
FIG. 6 depicts a simplified schematic top view of an embodiment of an alignment system.

Referring next to FIG. 6, a simplified schematic top view of an embodiment of an alignment system 600 is shown. The alignment system 600 is used to align and bond the optical fiber 104 to the v-groove assembly 108. The alignment system 600 comprises the optical fiber 104, the base 202 of the v-groove assembly 108, an optical source 604, an optical isolator 606, a splitter 608, a mirror 612, a detector 616, and a lamp 620.

The optical source 604 is a laser, LED, or RCLED (resonant-cavity LED) emitting light of a first wavelength (e.g., light centered at a first wavelength). In some embodiments, the first wavelength is between 1000 nm and 1800 nm or between 1300 nm and 1600 nm (e.g., having a peak intensity at 1550 nm). The optical isolator 606 passes light traveling from the optical source 604, and attenuates and/or blocks light from being transmitted to the optical source 604. The optical source 604 is optically coupled with the splitter 608, with the optical isolator 606 being between the optical source 604 and the splitter 608. The splitter 608 is optically coupled with the second end 115 of the optical fiber 104. For example, the splitter 608 is optically coupled with the receptacle 112 of the optical adapter 100.

The base 202 of the v-groove assembly 108 shown in FIG. 6 is similar to the base 202 of the v-groove assembly 108 show in FIG. 3. The lid 120 of the v-groove assembly 108 is not shown in FIG. 6. The bonding facet 208 of the base 202 of the v-groove assembly 108 is placed next to the mirror 612. In some embodiments, the bonding facet 208 touches the mirror. In some embodiments, the bonding facet 208 is placed close to the mirror 612, but not touching the mirror (e.g., less than 1, 2, 5, 7, or 10 µm away from the mirror).

The optical fiber 104 is placed in the v-groove 204 of the base 202 of the v-groove assembly 108. The tip 116 of the optical fiber 104 is directed towards the mirror 612. Adhesive is applied to the optical fiber 104 and/or the base 202 of the v-groove assembly 108 (e.g., to the v-groove 204, to an interface between the base 202 and the lid 120, and/or placing the lid 120 over the base 202, at least partially covering the optical fiber 103, and adhesive is applied between the optical fiber 104 and the lid 120, such that capillary action brings the adhesive into interfaces between the lid 120, the optical fiber 104, and/or the base 202). In some embodiments, adhesive is applied to the lid 120 of the v-groove assembly 108. In some embodiments, the adhesive applied to the optical fiber 104 and/or the base 202 of the v-groove assembly 108 is similar to the adhesive 316 applied between the bonding facet 208 and the edge facet 320 in FIG. 3. The bonding facet 208 helps orient the direction of beam propagation from the optical fiber 104 to be orthogonal a surface of the mirror 612, because the bonding facet 208 is orthogonal to a length of the v-groove 204. The lid 120 is placed over the v-groove 204, at least partially covering the optical fiber 104. The adhesive applied to the optical fiber and/or the base 202 of the v-groove assembly 108 is not cured until after aliment of the optical fiber 104 in the v-groove assembly 108. The bonding facet 208 is not bonded to the mirror 612.

The splitter 608 is optically coupled with the detector 616. In some embodiments, the detector 616 is a power meter. Light of the first wavelength is transmitted from the optical source 604, through the splitter 608 and into the optical fiber 104. Light of the first wavelength is then transmitted out the tip 116 of the optical fiber 104, to the mirror 612, and reflected back into the tip 116 of the optical fiber 104. Light of the first wavelength then travels from the tip 116 to the splitter 608 and to the detector 616.

A distance, which is referred to as a working distance 624, separates the tip 116 of the optical fiber 104 from the mirror 612. The optical fiber 104 is moved longitudinally (in an axial direction), within the v-groove 204, to adjust the working distance 624. The tip 116 of the optical fiber 104 is lensed. As the working distance 624 approaches a focal length of the lens of the tip 116, optical power at the detector 616 increases because more optical power is being reflected back into the optical fiber 104. The working distance 624 is optimized (e.g., to have power above a predetermined threshold, or a percentage of maximum). In some embodiments, after the working distance 624 is optimized, the optical fiber 104 is then advanced so that the tip 116 goes toward the mirror 612 (i.e., reducing the working distance 624) a predetermined distance corresponding to an expected thickness of adhesive 316 between the bonding facet 208 and the edge facet 320 (e.g., 1-10 µm).

After the working distance 624 is set, adhesive applied to the lid 120, the optical fiber 104, and/or the base 202 of the v-groove assembly 108 is at least partially cured using a light source of a second wavelength. In the alignment system 600, the lamp 620 is used as the light source of the second wavelength. The lid 120 is made of fused silica because fused silica transmits UV light. The lamp 620 emits UV light that is transmitted through the lid 120 to at least partially cure the adhesive applied to the optical fiber 104 and/or the base 202 of the v-groove assembly 108.

In some embodiments, an epoxy resin is placed on the v-groove assembly 108 and/or the optical fiber 104 before alignment so that the fiber 104 can be fixed in position after optimization. In some embodiments, the lid 120 serves to retain and protect the optical fiber 104 and/or serve as a handle for gripper 404 to hold the v-groove assembly 108 for lateral and/or axial alignment with the chip 308. In some embodiments, adhesive applied to the v-groove assembly 108 and/or the optical fiber 104 is also thermally cured. In some embodiments, the adhesive applied to the v-groove assembly and/or the optical fiber 104 has a first, initial cure followed by additional adhesive and a second cure. In some embodiments, the second cure is followed by a heat cure.

In some embodiments, once a set working distance 624 is known, then subsequent fibers can be positioned in v-groove assemblies 108 using a microscope and eyepiece (reticle scale). In some embodiments, in place of the splitter 608 and the isolator 606, an optical circulator may be used. In some embodiments, the lid 120, the v-groove 204, and/or the bonding facets 208 are made of fused silica. In some embodiments, the lid 120 is fused silica for curing epoxy resin that secures the lid 120 to other portions of the v-groove assembly 108 and/or to the optical fiber 104.

Figure 7:
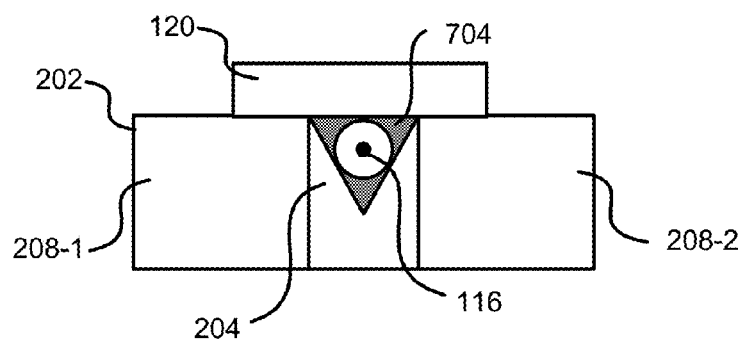
FIG. 7 depicts a simplified front view of an embodiment of a v-groove assembly during working-distance alignment.

FIG. 7 depicts a simplified front view of an embodiment of a v-groove assembly 108 during working-distance alignment. The v-groove assembly comprises the v-groove 204, a first bonding facet 208-1, a second bonding facet 208-2, and the lid 120. The tip 116 of the optical fiber 104 is shown between the lid 120 and the v-groove 204. Adhesive 704 between the lid 120 and the v-groove 204 bonds the optical fiber 104 to the v-groove assembly 108. In some embodiments, the adhesive 704 is used to bond the lid 120 to the base 202 of the v-groove assembly 108. In some embodiments, additional adhesive is used to bond the lid 120 to the base 202 of the v-groove assembly 108 (e.g., sides of the lid 120).

Figure 8:
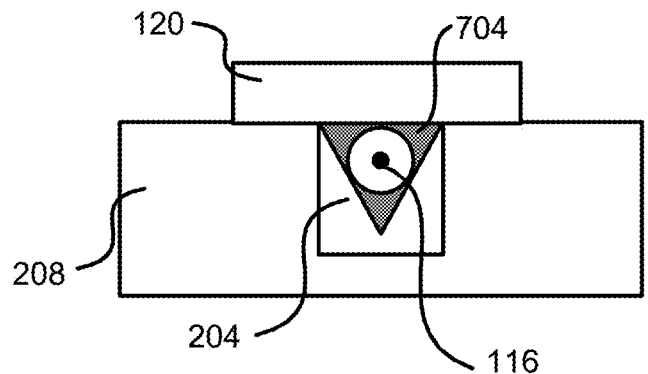
FIG. 8 depicts a simplified front view of another embodiment of a v-groove assembly.
Figure 9:
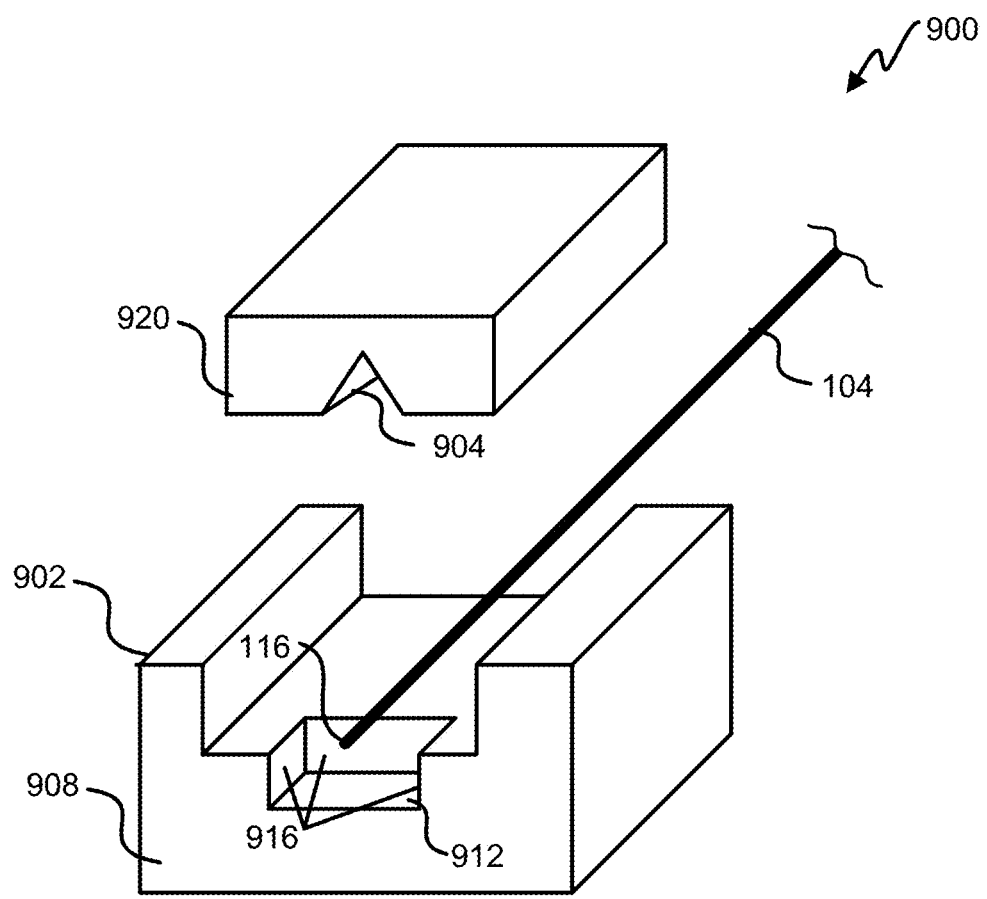
FIG. 9 depicts a simplified view of a further embodiment of a v-groove assembly.

Referring next to FIGS. 8 and 9, FIGS. 8 and 9 depict additional embodiments of the v-groove assembly 108. FIG. 8 depicts a simplified front view of an embodiment of a v-groove assembly 108. FIG. 8 is similar to FIG. 7, except instead of having the first bonding facet 208-1 and the second bonding facet 208-2, the v-groove assembly 108 in FIG. 8 has only one bonding facet 208.

FIG. 9 depicts a simplified view of an embodiment of a v-groove assembly 900. The v-groove assembly 900 comprises a base 902 and a lid 920. The lid 920 comprises a v-groove 904. The base 902 comprises a bonding facet 908. An optical fiber 104 is placed between the base 902 and the lid 920. The base 902 further comprises a recess formed by a floor 912 and walls 916. The recess helps prevent adhesive from getting on the tip 116 of the optical fiber 104.

Figure 10:
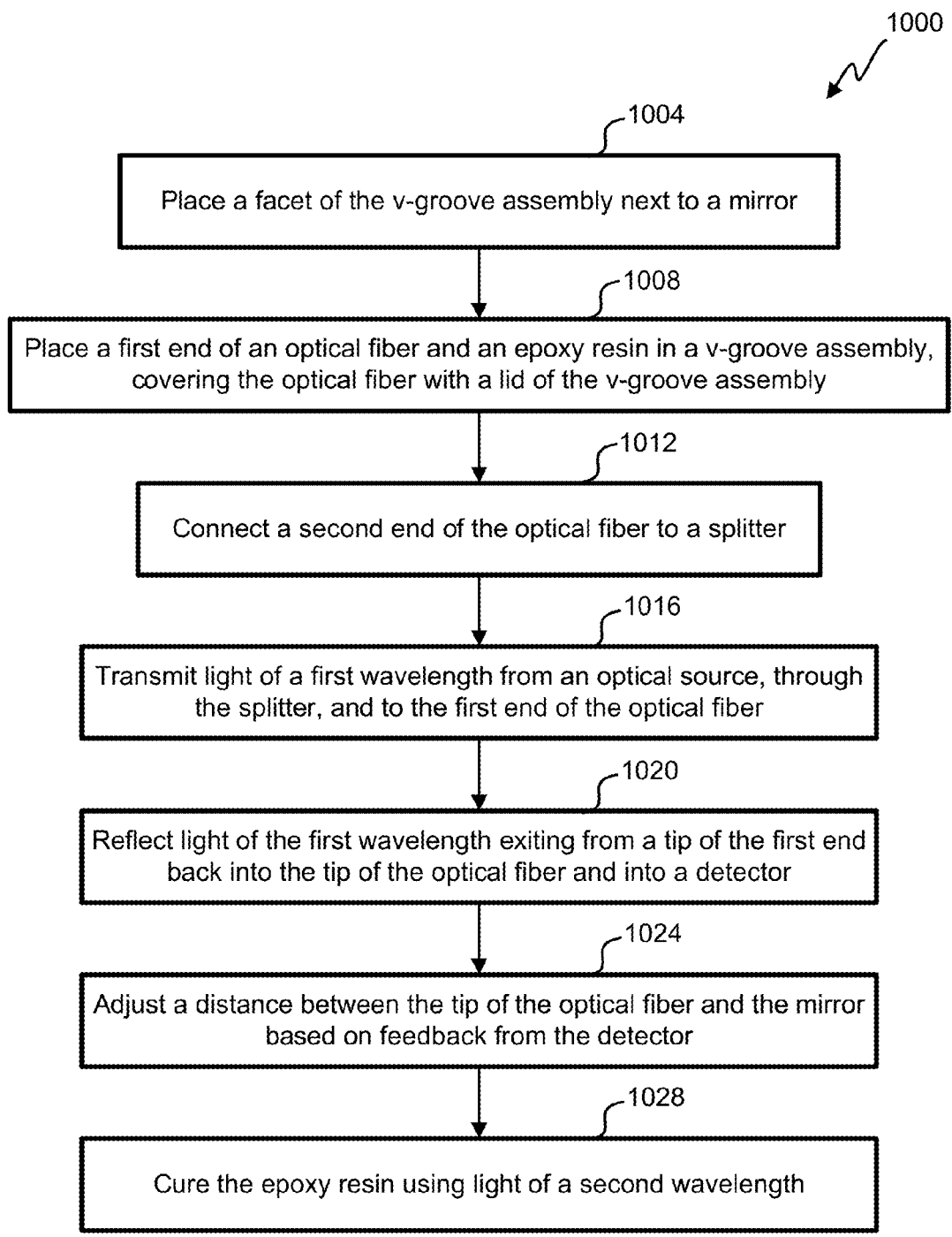
FIG. 10 depicts a flowchart of an embodiment of a process for aligning an optical fiber in the v-groove assembly.

FIG. 10 depicts a flowchart of an embodiment of a process 1000 for aligning an optical fiber 104 in the v-groove assembly (e.g., v-groove assembly 108 or 900). The process 1000 for aligning an optical fiber 104 in the v-groove assembly 108 begins in step 1004 by placing a facet (e.g., bonding facet 208) of the v-groove assembly next to a mirror (e.g., mirror 612). In some embodiments, placing the bonding facet 208 next to the mirror 612 means the bonding facet 208 contacts the mirror 612. In some embodiments, placing the bonding facet 208 next to the mirror 612 means the bonding facet 208 is close to, but not contacting, the mirror 612 (e.g., less than 15, 10, or 5 µm from the mirror 612). In some embodiments, the bonding facet 208 does not contact the mirror 612 in order to compensate for an estimated thickness of adhesive 316 for bonding the v-groove assembly 108 to the chip 308.

In step 1008, the first end 114 of the optical fiber 104 is placed in the v-groove 204 of the v-groove assembly 108. The lid 120 is placed on the base 202 of the v-groove assembly 108, covering at least a portion of the first end 114 of the optical fiber 104. The optical fiber 104 is between the base 202 of the v-groove assembly 108 and the lid 120 of the v-groove assembly 108. Then adhesive 704 (e.g. an epoxy resin) is applied between the optical fiber 104 and the lid 120. Capillary action draws the adhesive into an interface between the lid 120, the optical fiber 104, and/or the base 202. In step 1012, the second end 115 of the optical fiber 104 is connected to the splitter 608.

In step 1016, light of a first wavelength is transmitted from the optical source 604, through the splitter 608, and to the first end 114 of the optical fiber 104. In some embodiments, light of the first wavelength is transmitted through an optical isolator 606 positioned between the source 604 and the splitter 608. In some embodiments, the light of the first wavelength is infrared (e.g., between 1250 nm and 1600 nm). Light of the first wavelength is transmitted out of the first end 114 of the optical fiber 104 through the tip 116 of the optical fiber 104.

In step 1020, light of the first wavelength transmitted out of the first end 114 of the optical fiber 104 through the tip 116 of the optical fiber 104 reflects off the mirror 612 and back into the first end 114 of the optical fiber 104 through the tip 116 of the optical fiber 104. Reflected light of the first wavelength from the mirror 612 travels from first end 114 of the optical fiber 104, to the second end 115 of the optical fiber 104, to the splitter 608, and from the splitter 608 to the detector 616. The isolator 606 is used to keep light from reflecting back into the source 604.

In step 1024, a distance (e.g., the working distance 624) is adjusted between the tip 116 of the optical fiber 104 and the mirror 612 based on feedback from the detector 616. For example, the detector 616, in some embodiments, is a power meter. The tip 116 of the optical fiber 104 is moved axially (e.g., toward or away from the mirror 612) and a power reading of the detector 616 changes. Power increases as the working distance 624 approaches a focal length of the tip 116 (e.g., a lensed fiber). Power decreases as the working distance 624 departs from the focal length of the tip 116 of the optical fiber 104.

Once the working distance 624 is adjusted based on feedback from the detector 616, adhesive 704 in the v-groove 204 is cured using lamp 620. To cure the adhesive 704 in the v-groove, light of a second wavelength (e.g., UV light), is transmitted through the lid 120 to cure the adhesive 704 in the v-groove 204, step 1028. Since the lid 120 is made of fused silica, UV light can penetrate through the lid 120 to cure the adhesive 704 in the v-groove 204. Thus the optical fiber 104 can be aligned with, and bonded to, in the v-groove assembly 108 accurately and/or with less risk of altering alignment of the optical fiber 104 during curing than previous bonding techniques (e.g., alignment can be done before curing).

In some embodiments, the bonding facet 208 contacts the mirror 612 and adjusting the working distance 624 includes moving the tip 116 of the optical fiber 104 toward the mirror 612 to compensate for an estimated thickness of adhesive 316 for bonding the v-groove assembly 108 to the chip 308.

Figure 11:
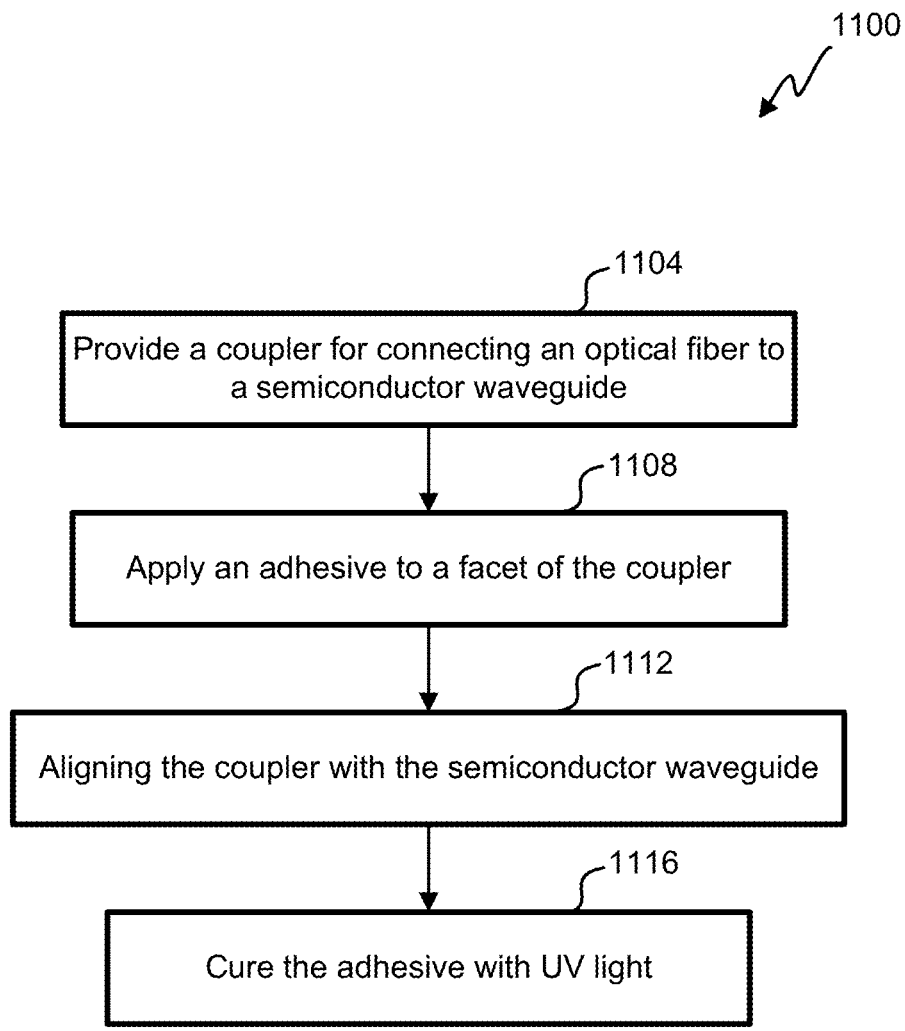
FIG. 11 depicts a flowchart of an embodiment of a process for connecting an optical fiber, which is bonded to a v-groove assembly, with a photonic chip.

FIG. 11 depicts a flowchart of an embodiment of a process 1100 for bonding a v-groove assembly 108, which is bonded to an optical fiber 104, to a chip 308. In some embodiments, the chip 308 comprises silicon (e.g., a silicon-on-insulator (SOI) wafer having a waveguide in a device layer of the SOI wafer). The process 1100 for bonding the v-groove assembly 108 to the chip 308 begins in step 1104 where a v-groove assembly 108 is provided. For example, the optical adapter 100, comprising the receptacle 112, optical fiber 104, and v-groove assembly 108, is provided.

An adhesive (e.g., adhesive 316, such as an epoxy resin) is applied to a facet (e.g., bonding facet 208) of the v-groove assembly 108, step 1108. In some embodiments, adhesive 316 is applied to the edge facet 320 in addition to, or in lieu of, applying adhesive 316 to the v-groove assembly 108. In some embodiments, applying adhesive 316 to the v-groove assembly comprises applying adhesive 316 to the edge facet 320 of the chip 308 and bringing the v-groove assembly 108 near the edge facet 320 so that adhesive 316 touches the bonding facet 208.

In step 1112, the v-groove assembly 108 is aligned with the chip 308. For example, the optical fiber 104, bonded to the v-groove assembly 108, is aligned with the waveguide 312 of the chip 308. In some embodiments, the gripper 404 is used to align the v-groove assembly 108 with the chip 308 (e.g., by holding the lid 120 of the v-groove assembly 108). In some embodiments, light from the optical fiber 104, which is coupled into the waveguide 312, is used in aligning the v-groove assembly 108 with the chip 308. For example, the waveguide 312 couples light from the optical fiber 104 to a photodetector (either on the chip 308, such as a PIN diode formed in the device layer of the SOI wafer, or off the chip 308). Feedback from the photodetector is used to align the optical fiber 104 to the waveguide 312.

In step 1116, the adhesive 316 is cured. In some embodiments, the adhesive 316 is an epoxy resin and is cured with UV light (e.g., similar to lamp 620 producing light of a second wavelength). In some embodiments, light of the second wavelength is transmitted through the v-groove assembly 108 (e.g., and through the bonding facet 208). Light of the second wavelength is transmitted through the v-groove assembly 108 because the v-groove assembly 108 is made of fused silica, which is transparent to UV light. In some embodiments, a second cure is performed after a first cure (e.g., see discussion relating to FIG. 3). In some embodiments, transmitting light of the second wavelength through the v-groove assembly 108 is done so that the gripper 404 can hold the v-groove assembly 108 in place after alignment and during cure so that the optical fiber 104 remains aligned with the waveguide 312. In some embodiments, the term "v-groove" is used as a generic term for a groove configured to position an optical fiber in a material, and may include shapes such as a 'v', a trench (e.g., flat sides), and 'u'-shaped grooves, depending on fabrication (e.g., trenches, in some embodiments, are easier to cut or etch in fused silica than a 'v'; in some embodiments, a v-groove is cut or etched if the base 202 is made of crystalline material and etching can be done by etching on a crystalline plane).

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

For example, in some embodiments, the waveguide 312 of the chip 308 comprises a taper to more efficiently couple light into the waveguide 312. In some embodiments, the waveguide 312 has rectangular cross section. In some embodiments, the waveguide is a ridge waveguide. In some embodiments, the mirror 612 comprises multilayers. In some embodiments, the mirror 612 comprises metal. In some embodiments, the mirror 612 is a block (e.g., a flat piece of metal).

In some embodiments, a tip 116 other than a lensed fiber is used (e.g., flat, cleaved end of a fiber). In some embodiments, the optical fiber 104 is aligned to a device other than the waveguide 312 of the chip 308. For example, the tip 116 of the optical fiber 104 could be aligned to a photodiode or a laser in the chip 308. In some embodiments, the lid 120 and/or the base 202 of the v-groove assembly are made of other material transparent to UV light (e.g., the lid 120 is made of quartz or UV-grade sapphire).

In some embodiments, the chip 308 comprises a light source (e.g., is made of III-V material as a gain medium for a laser). Light is coupled from the chip 308 to the optical fiber 104.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for aligning an optical fiber with a v-groove assembly, the method comprising:
  placing a facet of the v-groove assembly next to a mirror;
  placing a first end of the optical fiber in a v-groove of the v-groove assembly, wherein the v-groove assembly comprises a base and a lid;
  placing the lid over the optical fiber so that the optical fiber is between the base and the lid;
  applying an adhesive to the v-groove assembly and/or the optical fiber for bonding the optical fiber to the v-groove assembly;
  connecting a second end of the optical fiber to a splitter, wherein the splitter is optically coupled with an optical source and a detector;
  transmitting light of a first wavelength from the optical source, through the splitter, to the optical fiber, and out the optical fiber through a tip of the first end of the optical fiber;
  reflecting, with the mirror, light of the first wavelength from the tip of the optical fiber back into the optical fiber through the tip;
  transmitting light of the first wavelength from the tip to the detector through the splitter;
  receiving feedback from the detector;
  adjusting a distance between the tip of the optical fiber and the mirror based on feedback from the detector;

at least partially curing the adhesive using light of a second wavelength passing through the lid, after adjusting the distance between the tip of the optical fiber and the mirror.

2. The method for aligning the optical fiber with the v-groove assembly as recited in claim 1, wherein the lid is made of fused silica.

3. The method for aligning the optical fiber with the v-groove assembly as recited in claim 1, wherein the base is made of fused silica.

4. The method for aligning the optical fiber with the v-groove assembly as recited in claim 1, wherein light of the first wavelength is infrared light and light of the second wavelength is ultraviolet light.

5. The method for aligning the optical fiber with the v-groove assembly as recited in claim 1, wherein adjusting the distance between the tip of the optical fiber and the mirror includes moving the optical fiber in an axial direction to optimize received power at the detector.

6. The method for aligning the optical fiber with the v-groove assembly as recited in claim 1, further comprising bonding the v-groove assembly to a chip, after at least partially curing the adhesive.

7. The method for aligning the optical fiber with the v-groove assembly as recited in claim 6, wherein the chip comprises crystalline silicon.

8. The method for aligning the optical fiber with the v-groove assembly as recited in claim 6, wherein the chip comprises III-V material.

9. The method for aligning the optical fiber with the v-groove assembly as recited in claim 1, wherein the adhesive is an epoxy resin configured to be at least partially cured by ultraviolet light.

10. The method for aligning the optical fiber with the v-groove assembly as recited in claim 1, wherein the method further comprises transmitting the light of the first wavelength from the optical source and through an optical isolator before reflecting, with the mirror, light of the first wavelength from the tip of the optical fiber.

* * * * *